No. 705,796. Patented July 29, 1902.
E. R. SUTCLIFFE.
DISINTEGRATOR.
(Application filed Apr. 17, 1902.)
(No Model.) 3 Sheets—Sheet 1.

Witnesses,

Inventor
Edgar Routh Sutcliffe
By Johnson and Johnson
Attorneys.

No. 705,796. Patented July 29, 1902.
E. R. SUTCLIFFE.
DISINTEGRATOR.
(Application filed Apr. 17, 1902.)

(No Model.) 3 Sheets—Sheet 3.

Witnesses

Inventor
Edgar Rowe Sutcliffe
By Johnson & Johnson
Attorneys

UNITED STATES PATENT OFFICE.

EDGAR R. SUTCLIFFE, OF LEEDS, ENGLAND, ASSIGNOR OF ONE-HALF TO FRED SPEAKMAN, OF LEIGH, ENGLAND.

DISINTEGRATOR.

SPECIFICATION forming part of Letters Patent No. 705,796, dated July 29, 1902.

Application filed April 17, 1902. Serial No. 103,587. (No model.)

*To all whom it may concern:*

Be it known that I, EDGAR ROUSE SUTCLIFFE, a subject of the King of Great Britain, residing at Leeds, in the county of York, England, have invented a new and useful Disintegrator, of which the following is a specification.

My invention relates to improvements in disintegrators; and in the claims appended hereto I will particularly point out the parts and combinations of parts which constitute my improvement as applied to a disintegrator in which a revoluble beater operates in conjunction with a revoluble grinding-chamber, as illustrated in the accompanying drawings, in which—

Figure 1:
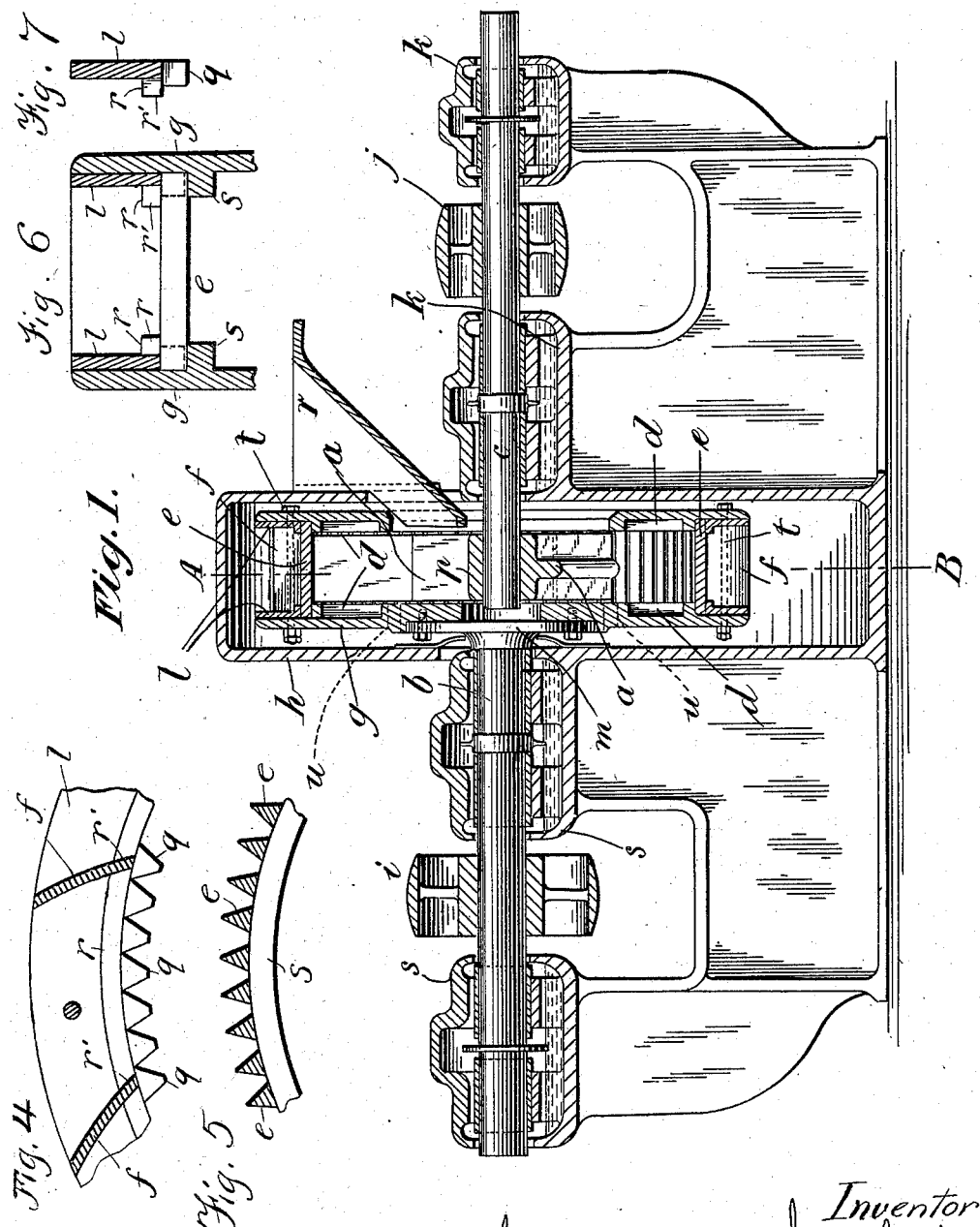
Figure 2:
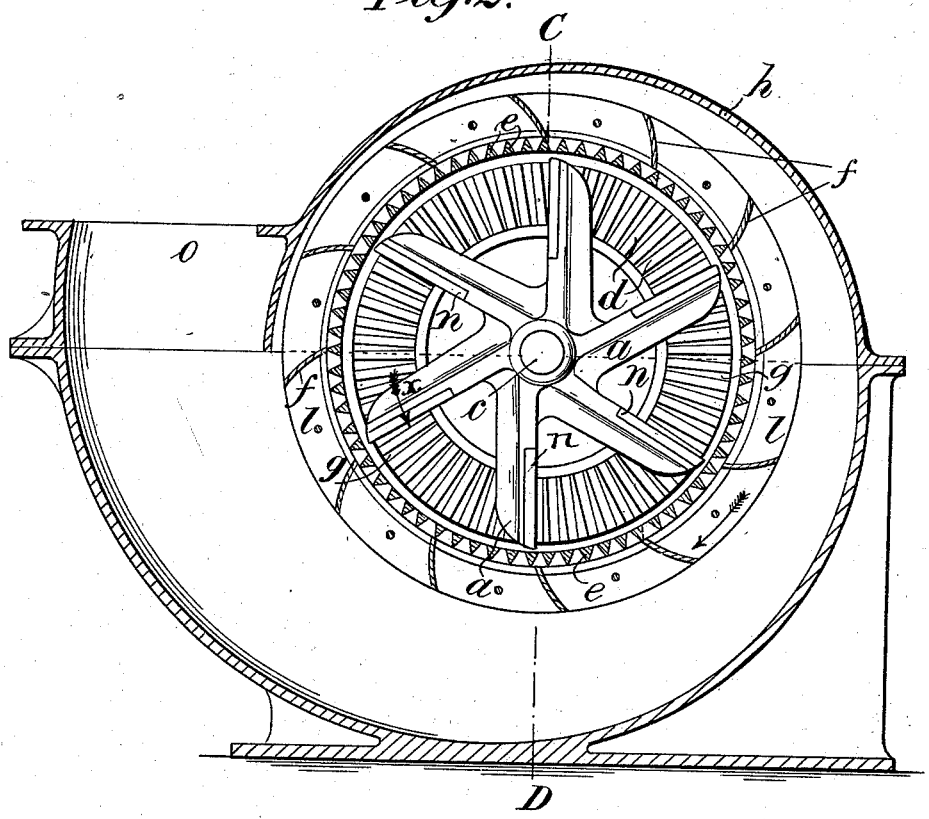
Figure 3:
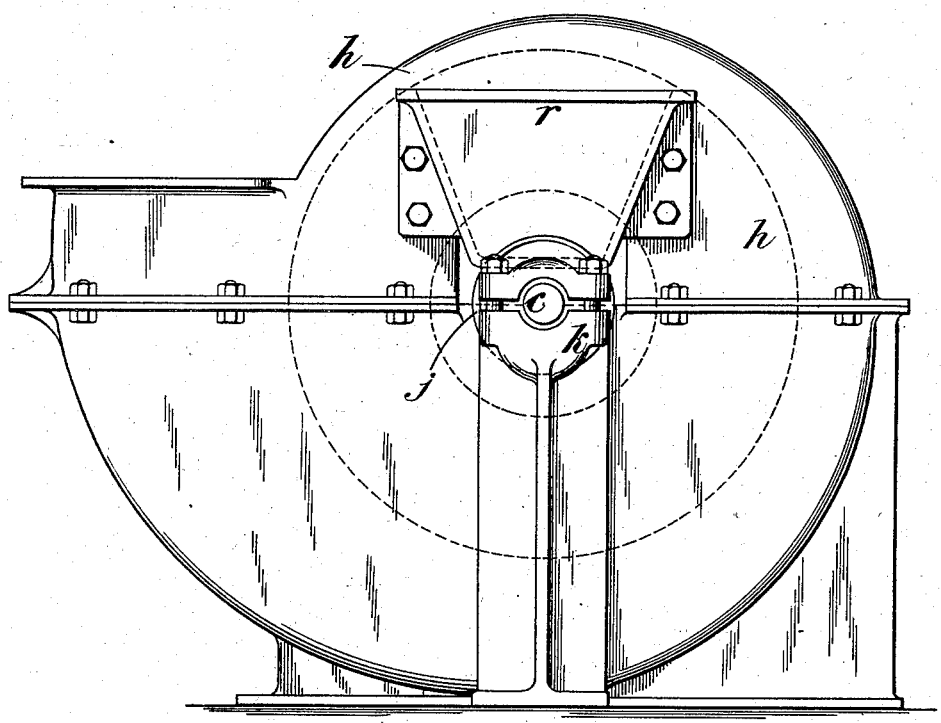

Figure 1 is a section taken through the line C D of Fig. 2 and looking from the left of Fig. 2. Fig. 2 is a section through the casing and grinding-chamber on the line A B. Fig. 3 is a side elevation of the machine, showing the feeding-hopper. Fig. 4 shows a portion of one of the ring-plates $l$, the serrations or teeth $q$ on its inner concave edge, and two of the fan-blades $f$, fitted in notches $r'$ in the annular rim at the edge from which the teeth project. Fig. 5 shows the grid-bars as seated upon the annular shoulders $s\ s$ of the chamber sides in their spaced relation and which is maintained by the toothed rings seen in Fig. 4. Fig. 6 shows a portion of the chamber sides and the annular shoulders $s\ s$ on the inner walls thereof on which the grid-bars $e$ are shown seated and which are spaced and secured by the ring-teeth $q$, which are adapted to fit between the grid-bars. Fig. 7 shows in section one of the toothed rings and its notched rim $r$ for holding the fan-blades.

Similar letters refer to similar parts throughout the several views.

Referring first to Fig. 2, $a\ a$ are the beaters, revolving at a high speed in the direction shown by the arrow $x$. They are carried by the shaft $c$, running in bearings $k\ k$, so that the beaters overhang within the casing $h$. Attached to the shaft $b$, which ends in the form of a disk $m$, is the revolving grinding-chamber $g$, which also overhangs within the casing $h$ and in such a manner as to surround the beaters $a\ a$. The beaters shown are provided with face-plates $n\ n$, which are renewable. These face-plate $a$ in their function as beaters secured to arms of the boss or hub $p$ form also fan-blades, the effect of which is that while pulverizing the material will also force it in a blast from the chamber through its circumferential openings between the grid-bars, and thereby coöperate with the external circumferential fan-blades $f$, which act to draw the ground material from the chamber through its circumferential openings. In this construction the circumferential fan is fixed to and revolves with the grinding-chamber, while the internal fan-beater is fixed to and revolves on a separate shaft-section. Between these two separate revolving fans is the grid, and the two air forces coöperate to keep the grinding-chamber free of the material as it is reduced. The grinding-chamber is revolved in a direction opposite to that of the beaters and is provided at the sides with the serrated surface or teeth $d$ and at the periphery with the bars $e$, which are held so as to leave small spaces between their adjoining edges through which the ground material passes out of the chamber. Outside the periphery of the chamber and attached to the sides thereof a fan is provided which consists of the two rings $l\ l$, connected together and to the blades or ribs $f\ f$ by the bolts $t$, so that the action of the fan draws the air or finely-ground material out of the interior of the chamber and forces it around the casing to the outlet $o$ and into a settling-chamber or other receptacle where it is required.

The feed side of the grinding-chamber is connected to the closed side by means of bolts $t$, which also secure the fan-rings $l\ l$ to the sides of the grinding-chamber. The rings forming the sides of the fan are serrated on their inner edges to form teeth like a saw edge, between which are held the bars $e$, forming the grid. These bars are held so as to leave spaces between them of a size to suit the fineness of the grinding and can be renewed by removing the fan binding-ring plates.

In Fig. 4 is seen a portion of one of the toothed ring-plates, the teeth $q$ of which are formed on its concave edge as the means for spacing and securing the grid-bars. In this figure two of the fan-blades are shown with their inner edges secured in notches $r'$, formed in annular rims $r$ on the inner sides of the rings.

In Fig. 5 the grid-bars are shown as seated upon an annular shoulder $s$ on the side wall of the grinding-chamber, and when so seated are spaced and secured by and between the teeth $q$ of the pair of rings $l$. In Fig. 6 is seen the pair of toothed rings on the inner sides of the grinding-chamber, a grid $e$, seated upon the annular shoulders $s\ s$ and secured thereon by the toothed rings, and the notches $r'\ r'$ being also shown in the ring-rims to receive and confine the inner edges of the fan-blades $f$, the blade in this figure not being shown. It is important to note that while the bolts $t$ clamp the fan-blades to and between the toothed rings the bolts also serve to clamp the latter to the sides of the chamber, as in Fig. 1. The teeth $q$ and the notched side rims $r$ are better seen in Fig. 7.

A feed-hopper $r$ is arranged in the side of the casing, through which material is delivered within the circle of the open side of the grinding-chamber. It is immediately caught by the wing-beaters $a$, and it will be understood that the impact between the beaters $a$ and the side teeth $d$ of the chamber is very great, corresponding to a much higher speed than can be attained by beaters revolving in a stationary chamber. When reduced to a fine enough degree, the material will be drawn by the action of the fan-blades from the chamber through the grids $e$ and then forced around the casing to the outlet $o$. The outlet may be as shown at $o$ or in any other suitable position to suit the delivery required, and the material may be forced to a considerable distance by the power of the fan. The power of the air-current is increased by the spiral form of the outer casing, and in large machines or when using coarse grids additional inlets, such as are shown by dotted lines at $u\ u$, for air may be provided at the center of the casing, so that a free suction is obtained.

The shaft $b$ runs in the bearings $s\ s$ independently of the shaft $c$, and consequently the relative speeds of the grinding-chamber and of the beaters may be made to vary to any desired extent by altering the sizes of the driven pulleys $i$ and $j$, respectively. Usually I prefer to run the chamber at a slower speed than the beaters, and I therefore provide a larger pulley $i$ on the shaft $b$ than on the shaft $c$. Collars are provided on the shafts $b$ and $c$ to prevent their movement longitudinally, and they are preferably run in self-oiling bearings; but as these form no part of the present invention they will not be further described.

The upper half of the disintegrator-casing is removable to allow of the insertion of the beaters and grinding-chamber, being connected to the lower half by flanges and bolts.

What I claim as my invention, and desire to secure by Letters Patent, is—

1. In a disintegrator and in combination, a fixed casing having a feed-inlet and a discharge, a revoluble grinding-chamber having circumferential openings and fan-blades fixed around and outside of the circumferential openings and revolving with the grinding-chamber, whereby the ground material is drawn from the chamber into the casing and ejected from the latter.

2. In a disintegrator and in combination, a fixed casing having a feed-inlet and a discharge, a revoluble grinding-chamber having circumferential openings, fan-blades fixed around and outside of the circumferential openings and revolving with the grinding-chamber, and a revoluble fan-beater within the revoluble grinding-chamber, whereby the ground material is both drawn and forced from the chamber into the casing.

3. In a disintegrator and in combination, a fixed casing having a feed-inlet and a discharge, a revoluble grinding-chamber, fan-blades fixed to said chamber outside of and around its circumferential openings, a revoluble fan-beater within said chamber, and a circumferential grid between the external and the internal fan parts.

4. In a disintegrator and in combination, a fixed casing having a feed-inlet and a discharge, a revoluble grinding-chamber having a circumferential grid of bars, a fan carried by the chamber external to its grid, and surrounding it, and means whereby the grid-bars and their surrounding fan-blades are separately fastened together and to the side walls of the grinding-chamber.

5. In a disintegrator and in combination, a fixed casing having a feed-inlet and a discharge, a revoluble grinding-chamber having a circumferential grid of bars and means for spacing and securing the grid-bars consisting of a pair of ring-plates each formed with serrations or teeth on their concave edges by which the ends of the bars are spaced, and bolts binding the toothed rings upon the ends of the bars.

6. In a disintegrator and in combination, a fixed casing having a feed-inlet and a discharge, a revoluble grinding-chamber having circumferential grid of bars, fan-blades fixed around and outside of the circumferential grid, and means whereby the grid-bars are spaced and together with the fan-blades are fastened between the side walls of the chamber, consisting of a pair of ring-plates, each formed with serrations or teeth on their concave edges between which the ends of the grid-bars are spaced and bolts passing through the chamber-walls and through the toothed ring-plates binding the latter and the fan-blades together upon the ends of the grid-bars.

7. In a disintegrator and in combination with a fixed casing having a feed-inlet and a discharge, a revoluble grinding-chamber having circumferential grid of bars, a pair of rings having serrations adapted to intermatch with the grid-bars, fan-blades around and outside of the circumferential grid, and means whereby, the fan-blades, the toothed rings, and the grid-bars are detachably secured to the sides of the grinding-chamber.

In testimony that I claim the foregoing as my invention I have signed my name in presence of two subscribing witnesses.

E. R. SUTCLIFFE.

Witnesses:
LEWIS DEXTER,
CHAS. GILLIARD.